United States Patent
Petajisto

(10) Patent No.: US 7,180,853 B1
(45) Date of Patent: Feb. 20, 2007

(54) METHOD AND APPARATUS FOR PERFORMING A CONNECTION ADMISSION CONTROL

(75) Inventor: Antti Petajisto, Espoo (FI)

(73) Assignee: Nokia Corporation, Espoo (FI)

( * ) Notice: Subject to any disclaimer, the term of this patent is extended or adjusted under 35 U.S.C. 154(b) by 1325 days.

(21) Appl. No.: 09/716,711

(22) Filed: Nov. 20, 2000

Related U.S. Application Data

(63) Continuation of application No. PCT/EP98/03388, filed on Jun. 5, 1998.

(51) Int. Cl.
G01R 31/08 (2006.01)

(52) U.S. Cl. ..................... 370/220; 370/233

(58) Field of Classification Search ............. 370/230, 370/232, 233, 234
See application file for complete search history.

(56) References Cited

U.S. PATENT DOCUMENTS

| | | | |
|---|---|---|---|
| 5,347,511 A | | 9/1994 | Gun |
| 5,784,358 A | * | 7/1998 | Smith et al. ............... 370/230 |
| 5,917,804 A | * | 6/1999 | Shah et al. ................ 370/230 |
| 6,141,322 A | * | 10/2000 | Poretsky .................... 370/231 |
| 6,459,681 B1 | * | 10/2002 | Oliva ........................ 370/232 |
| 6,665,264 B1 | * | 12/2003 | Davison et al. ............ 370/230 |

FOREIGN PATENT DOCUMENTS

EP 0584029 2/1994

OTHER PUBLICATIONS

Roberts et al, "Broadband network teletraffic: performance evaluation and design of broadband multiserice networks; final report of action COST 242", Springer-Verlag, Berlin, 1996.

Kalevi Kilkki, *Traffic Characterisation and Connection Admission Control in ATM Networks*, Dissertation Presentation Dec. 20, 1994, Espoo, Finland, pp. 32-33.

Roch Guerin, et al., *Equivalent Capacity and Its Application to Bandwidth Allocation in High-Speed Networks*, Selected Areas in Communcations, IEEE Journal, vol. 9, Iss. 7, Sep. 1991, pp. 968-981.

Sari Saranka, et al., *Optimization of Effective Variance Based CAC Algorithms*, Global Telecommuncations Conference, Nov. 18-22, 1996. Communications: The Key to Global Prosperity, vol. 2, pp. 1212-1216.

Karl Lindberger, *Analytical Methods for the Traffical Problems with Statistical Multiplexing in ATM-Networks*, Proc. 13th ITC, Copenhagen, 1991, vol. 14, pp. 807-813.

* cited by examiner

Primary Examiner—Chau Nguyen
Assistant Examiner—Thien D. Tran
(74) Attorney, Agent, or Firm—Squire, Sanders & Dempsey, L.L.P.

(57) ABSTRACT

In summary, a method and apparatus for performing a connection admission control in an asynchronous network node is disclosed, wherein approximation parameters obtained by approximating a traffic parameter function defining an effective bandwidth of a connection are stored and used to determine a value representing an effective bandwidth of a requested new connection. Since the approximation parameters are calculated in advance and stored, the determination of the effective bandwidth of a requested connection can be performed by simple calculations based on the stored approximation parameters. Thus, the invention presents an extremely simple CAC procedure which is accurate enough to take full advantage of statistical multiplexing. Due to the fast calculations, the connection admission control method and apparatus are suitable for real-time connection admission control decisions.

12 Claims, 3 Drawing Sheets

METHOD AND APPARATUS FOR PERFORMING A CONNECTION ADMISSION CONTROL

This application is a continuation of international application serial number PCT/EP98/03388, filed 5 Jun. 1998.

FIELD OF THE INVENTION

The present invention relates to a method and apparatus for performing a connection admission control in an asynchronous network node, like for example an ATM (Asynchronous Transfer Mode) network node, in order to determine whether a new connection can be admitted.

BACKGROUND OF THE INVENTION

An ATM network needs to support certain service categories defined by ATM Forum standards. Among these service categories are constant bit rate (CBR), real-time variable bit rate (rt-VBR), non-real-time variable bit rate (nrt-VBR), available bit rate (ABR), and unspecified bit rate (UBR). The problem with VBR traffic is that there is great variation in the bit rate of each connection, yet the network has to guarantee a certain maximum cell loss ratio (CLR) for each connection.

Each ATM network node needs a connection admission control (CAC) procedure to determine whether a new connection can be admitted. If too many connections are admitted, the network cannot provide the agreed CLR, since it only has a limited capacity. If too few connections are admitted, the network capacity is not used efficiently. The challenge of CAC is to calculate how many connections the network node can have without violating the CLR constraint of the connections.

Telecommunications companies and universities have investigated the CAC problem for several years. Basic CAC algorithms which can be used for the CAC decision are based on two traffic parameters, i.e. the peak cell rate (PCR) and the sustainable cell rate (SCR, also known as the average cell rate).

In these algorithms a worst-case scenario is assumed, which means that all traffic sources are assumed to be on-off sources, either transmitting at the PCR or not transmitting at all. The probability p that a source is transmitting at any moment in time is given by p=SCR/PCR.

Furthermore, these algorithms assume that cells cannot be buffered to any significant extent. Only cell-scale buffers, which prevent cell loss if a few sources send their cells simultaneously, are included and in the burst scale the ATM Switch is assumed bufferless. This is a realistic assumption for real-time VBR traffic, which cannot be buffered anyway due to its stringent delay requirements.

According to a so-called PCR allocation, bandwidth (which is a common term for transmission capacity) is reserved at the peak rate (PCR) of a connection. However, this is clearly an overly conservative estimate and results in very low bandwidth utilization.

According to a so-called large deviations approximation described in "Broadband network teletraffic: performance evaluation and design of broadband multiservice networks; final report of action COST 242" by James Roberts et al., Springer-Verlag, Berlin, 1996, a theory is provided which allows to calculate very accurate values for very small CLRs ($10^{-4}$ ... $10^{-15}$).

Other approximations for finding the bandwidth requirement of a set of connections have been proposed by e.g. Guerin, Lindberger and Kalevi Kilkki.

However, the known solutions give good results but require so much computation that they might no be sufficiently fast in real-time CAC decisions. The large deviation theory is an example of this. Other solutions are a lot faster but relatively inaccurate in terms of bandwidth utilization. The PCR allocation is an extreme example of this.

SUMMARY OF THE INVENTION

It is an object of the present invention to provide a method and apparatus for performing a connection admission control which allows a fast allocation of a maximum number of connections in the network.

This object is achieved by a method for performing a connection admission control in an asynchronous network node, comprising the steps of:
storing approximation parameters obtained by approximating a traffic parameter function defining an effective bandwidth of a connection;
determining a value representing an effective bandwidth of a requested new connection by using the stored approximation parameters;
increasing a value representing a total effective bandwidth by the determined value; and
admitting the requested new connection, if the increased value representing the total effective bandwidth is not larger than a predetermined value.

Furthermore, the above object is achieved by an apparatus for performing a connection admission control in an asynchronous network node, comprising:
storing means for storing approximation parameters obtained by approximating a traffic parameter function defining an effective bandwidth of a connection;
determining means for determining a value representing an effective bandwidth of a requested new connection by using the stored approximation parameters;
counting means for increasing a value representing a total effective bandwidth by the determined value;
comparing means for comparing the value representing the total effective bandwidth with a predetermined value; and
control means for admitting the requested new connection, if the increased value representing the total effective bandwidth is not larger than a predetermined value.

Accordingly, since approximation parameters obtained by approximating the traffic parameter function defining an effective bandwidth are stored in advance, the determination of the value representing the effective bandwidth of a requested new connection can be reduced to a very simple and fast calculation, so that a fast connection admission control suitable for real-time CAC decisions can be provided.

By reducing the approximation region to a particular part of the parameter space tailored to the individual traffic parameter combinations of a network node, extremely accurate effective bandwidth values can be obtained.

Preferably, different approximation parameters may be stored for different maximum cell loss ratios, wherein the value representing the effective bandwidth is determined in dependence on a desired cell loss ratio by selecting the stored approximation parameters according to the desired cell loss ratio.

Thus, the connection admission control procedure can be adapted to different maximum cell loss ratio requirements by simply switching the stored approximation parameters.

Preferably, the predetermined value is a link capacity of a multiplexed transmission link used for establishing the requested connection. Effective bandwidths can easily be adapted to changes of the link capacity simply by updating the total effective bandwidth counter value or the total effective bandwidth counter value and the predetermined value according to the capacity change.

Furthermore, the value representing the effective bandwidth of a requested connection may be determined by using the equation:

$$b_{eff} = a \cdot PCR^{\alpha} \cdot SCR^{\beta} \cdot C^{\gamma}$$

wherein a, $\alpha$, $\beta$ and $\gamma$ represent said stored approximation parameters, PCR represents a peak cell rate of the requested connection, SCR a sustainable or average cell rate of the requested connection and C the link capacity, wherein the approximation is a linear approximation, and wherein the traffic parameter function is a logarithmic function.

Thus, the effective bandwidth of a requested connection can be determined by a simple calculation using the stored approximation parameters.

Preferably, the approximated traffic parameter function is a logarithmic function of a ratio between the peak cell rate of the requested connection and the link capacity and of the burst probability of the requested connection. Such a traffic parameter function provides a highly linear surface region which can be approximated with a high degree of accuracy.

Preferably, the ratio between the peak cell rate of the requested connection and the link capacity may be checked when a connection request is received, wherein the value representing the effective bandwidth of the requested connection is determined only on the basis of the peak cell rate, when the ratio between the peak cell rate and the link capacity exceeds a predetermined value.

Accordingly, a non-linear region of the approximated traffic parameter function, which exists for small numbers of connections to be multiplexed, can be excluded from the statistical CAC procedure of the present invention.

Furthermore, different approximation parameters obtained by approximating different regions of the traffic parameter function may be stored, wherein the approximation parameters are selected in accordance with a region, in which the traffic parameters of the requested connection are located. Since more than one surface of the traffic parameter function is approximated, more accurate results can be obtained in the whole interesting parameter space. Thus, the approximation can be easily tailored to provide extremely accurate values in particular parts of the parameter space by simply performing the approximation there. This is a valuable property, if an operator knows certain traffic parameters which are encountered more frequently than others.

The value representing the effective bandwidth of the requested connection can be determined as a fraction of the link capacity, wherein said predetermined value is 1. The use of relative effective bandwidths defined as fractions of the link capacity leads to a higher convenience and generality of the underlying calculations. Thus, a new connection can be admitted, if the increased value incremented by the effective bandwidth value does not exceed the relative link capacity C=1.

Furthermore, input means may be provided for inputting a desired cell loss rate, wherein different approximation parameters for different cell loss rates are stored in the storing means, and wherein the determining means are arranged to determine the value representing the effective bandwidths of the requested connection by using approximation parameters corresponding to the input cell loss rate.

Further preferred developments of the present invention are defined in the dependent claims.

BRIEF DESCRIPTION OF THE DRAWINGS

In the following, the invention will be described in greater detail on the basis of a preferred embodiment with reference to the accompanying drawings, wherein.

DESCRIPTION OF THE PREFERRED EMBODIMENT

Figure 1:
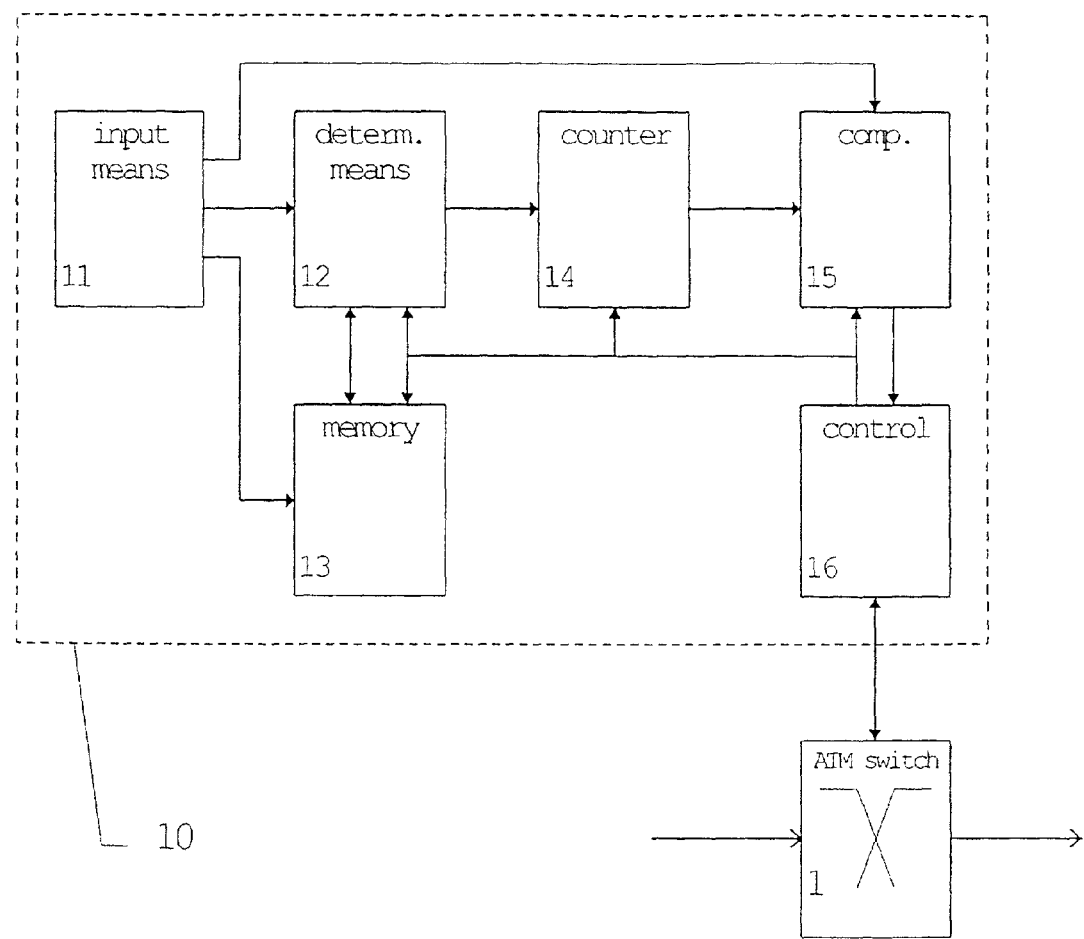
FIG. 1 shows an apparatus for performing a connection admission control according to a preferred embodiment of the present invention.

A preferred embodiment of the present invention is shown in FIG. 1, wherein the connection admission control for an ATM switch 1 is performed by a connection admission control apparatus 10.

The connection admission control apparatus 10 comprises a determining means 12 for determining an effective bandwidth $b_{eff}$ of a requested connection based on approximation parameters obtained by approximating a traffic parameter function defining the effective bandwidth of a connection.

The approximation parameters can be calculated off-line for various cell loss ratio (CLR) requirements and can be written into the memory 13 by an input means 11 operated by an operating person. The connection admission control (CAC procedure) performed by the CAC apparatus 10 is based on a counter 14 for all connections which are multiplexed together by the ATM switch 1.

The counter 14 starts at zero, when no connections are present, and every time a new connection is admitted, it is increased by the effective bandwidth of the connection as determined by the determining means 12. In particular, the CAC apparatus 10 admits a new connection request, if $$\text{counter value} + b_{eff} \leq C \quad (1)$$

wherein $b_{eff}$ represents the effective bandwidth of the requested connection and C the bandwidth available for all the connections which can be multiplexed together by the ATM switch 1.

In the present embodiment, a comparator 15 is provided which compares the result obtained from the counter 14 by increasing the present counter value by the effective bandwidth $b_{eff}$ of a requested connection with the bandwidth C available for all connections. The available bandwidth C will be hereinafter referred to as the link capacity of the transmission link to which the ATM switch 1 switches the requested connections.

The output of the comparator 15 is transferred to a control means 16 which judges the admission or rejection of the requested connection in dependence on the comparison result output by the comparator 15. In case the comparison result indicates that the counter value exceeds the link capacity C, the control means 16 controls the ATM switch 1 so as to reject the requested connection and causes the counter 14 to restore the counter value obtained by the last admitted connection.

It is to be noted that the connection admission control apparatus 10 could also be a workstation used for controlling the ATM switch 1, wherein the workstations performs the above connection admission control procedure on the basis of a control program.

In the following, an approximation method for obtaining the approximation parameters stored in the memory 13 is described.

The effective bandwidth of a connection can be drawn as a function of a ratio between the peak cell rate (PCR) of the connection and the link capacity C of the ATM switch 1 and of a burst probability p defined as the ratio between a sustainable or average cell rate SCR and the peak cell rate PCR, when the cell loss ratio CLR is fixed.

Previous studies have shown that the boundary of the admission region for connections with different traffic parameters is linear in the interesting part of the parameter space, such that effective bandwidths can be simply added together.

Figure 2:
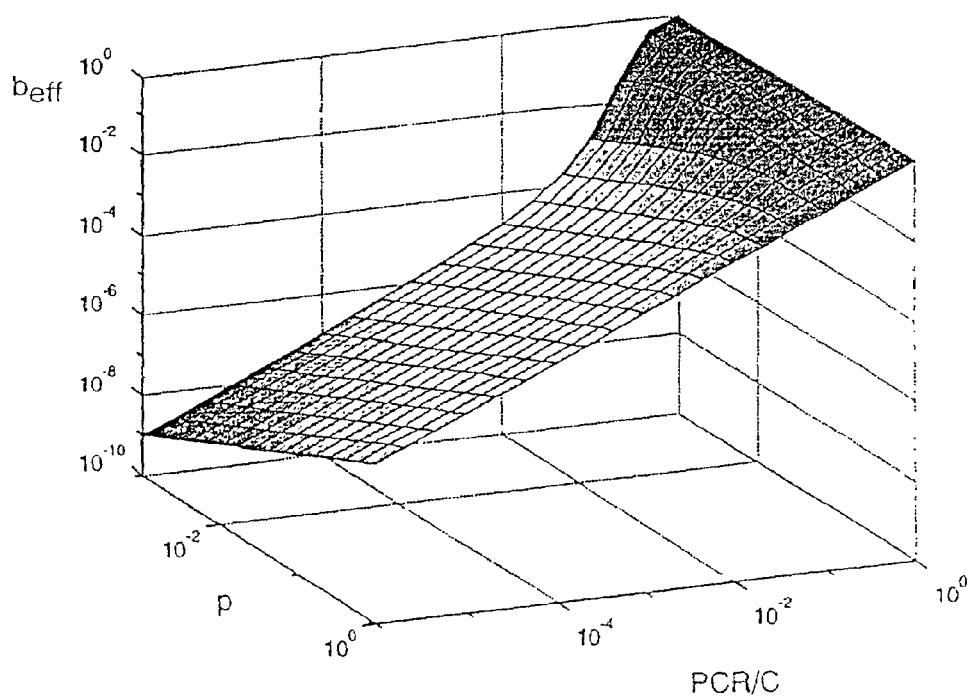
FIG. 2 shows a diagram of the effective bandwidth of a connection as a function of the PCR/C ratio and the burst probability p, obtained for a cell loss ratio CLR=$10^{-9}$.

FIG. 2 shows the effective bandwidth of a connection for virtually any imaginable combination of traffic parameters and a cell loss ratio $CLR=10^{-9}$. The values in the figure have been calculated using the above mentioned large deviations approximation theory for heterogeneous connections. The tolerance was set to such a small value that this effective bandwidth can be considered exact. The effective bandwidths are shown as a function of the PCR to link capacity ratio PCR/C and the burst probability p of a connection. The burst probability p is the probability that an on/off source is transmitting at any given moment, which varies from 1 (CBR traffic) to 0.001 (where PCR is 1,000 times the SCR). The relevant size of a connection is determined by the PCR to link capacity ratio. The inverse of this figure indicates how many such connections can fit in the network without experiencing any cell loss. The absolute values of PCR, SCR and effective bandwidths are irrelevant. Thus, only their values relative to the link capacity are preferably used.

The scales of the PCR/C ratio, p and effective bandwidth are preferably all logarithmic. This is needed because only a logarithmic scale can cover a sufficiently wide range of traffic parameters which we might need in future ATM networks, while a linear scale would only capture one scale at a time. Also the effective bandwidth is shown on a logarithmic scale, since otherwise its values could not be observed properly for such a variety of traffic parameters.

As can be gathered from FIG. 2 the effective bandwidth begins to fall in a linear fashion, when the PCR/C ratio falls below $10^{-1}$, i.e. there are more than ten connections multiplexed together. Linearity also applies in the other direction, along a logarithmic burst probability scale. As PCR/C falls below $10^{-2}$, linearity becomes even more evident.

Essentially, the surfaces of the function defining the effective bandwidth look exactly the same for different cell loss ratios, wherein the linear region starts earlier for larger cell loss ratios which hence allow greater gains from statistical multiplexing. However, since $CLR=10^{-9}$ is more likely to be a realistic cell loss value, it is reasonable to focus most of the attention to this surface as shown in FIG. 2.

Figure 3:
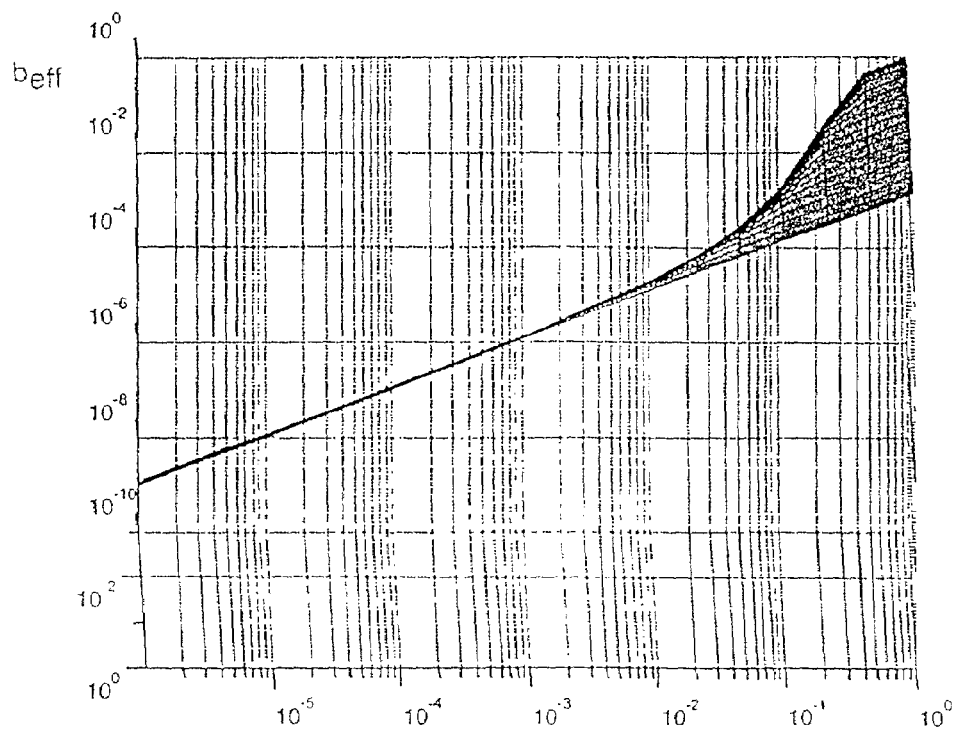
FIG. 3 shows the diagram accoring to FIG. 2, when viewed from the direction of the burst probability axis.

FIG. 3 shows exactly the same surface for $CLR=10^{-9}$, but seen from the direction of the axis of the burst probability p, so that linearity becomes even more evident.

The line closest to the viewer represents the p=1 line, i.e. constant bit rate (CBR) sources which require PCR allocation. Also the edge where PCR/C=1 requires PCR allocation. The upper right-hand corner of the diagram represents connections with relatively high PCRs and almost constant bit rates, so PCR allocation is used for all such connections.

However, as the peak rate decreases or the burst probability of a source decreases, more connections can be multiplexed together, and an increasing statistical multiplexing gain is attained. In this statistical bandwidth allocation region, the logarithm of the effective bandwidth is a surprisingly linear logarithmic function of PCR/C and p. In other words, the effective bandwidth of a connection is given by a planar surface in the logarithmic space.

The following formula is obtained as a general representation of this surface:

$$\log_{10}(b_{\it eff}) = \alpha + \beta \log_{10}(p) + \gamma \log_{10}(PCR/C) \quad (2)$$

where $\alpha$, $\beta$ and $\gamma$ are real-valued constants.

Performing $10^x$ on both sides of the equation gives:

$$b_{\it eff} = 10^{\alpha} \cdot 10^{\beta \log_{10}(p)} \cdot 10^{\gamma \log_{10}(PCR/C)} \quad (3)$$

$$b_{\it eff} = 10^{\alpha} \cdot p^{\beta} \cdot (PCR/C)^{\gamma} \quad (4)$$

Substituting actual traffic parameters PCR and SCR for the burst probability p=SCR/PCR, the equation (4) can be read as:

$$b_{\it eff} = 10^{\alpha} \cdot (SCR/PCR)^{\beta} \cdot (PCR/C)^{\gamma} \quad (5)$$

$$b_{\it eff} = 10^{\alpha} \cdot PCR^{(\gamma-\beta)} \cdot SCR^{\beta} \cdot C^{-\gamma} \quad (6)$$

This formula can be further simplified by choosing a new set of constants determined by $$a' = 10^{\alpha}; \ \alpha' = \gamma - \beta; \ \beta' = \beta; \ \gamma' = \gamma \quad (7)$$

Hence, the formula can be reduced to its final form:

$$b_{\it eff} = a \cdot PCR^{\alpha'} \cdot SCR^{\beta'} \cdot C^{\gamma'} \quad (8)$$

The constants a, $\alpha'$, $\beta'$, $\gamma'$ can be easily calculated from the old constants $\alpha$, $\beta$ and $\gamma$ according to equation (7), which, in turn, can be determined on the basis of the linearization of equation (2). As already mentioned, the constants can be calculated off-line, so that precalculated values are readily accessible in the memory 13 when a connection request arrives.

The equation (8) will be referred to in the following as the log-linear approximation.

It should, however, be noted that any other type of approximation could be used for determining suitable approximation parameters corresponding to the above mentioned constants a, $\alpha'$, $\beta'$ and $\gamma'$.

Since the actual surface of the effective bandwidth function as shown in FIGS. 2 and 3 is not perfectly linear in the whole parameter space, there is not just one right way of fitting a plane to match this surface. Hence, there is not just one right set of constants for the equation (8). The following basic CAC criteria can be applied:
1. The plane should give accurate values for all the expected combinations of traffic parameters.
2. Any possible inaccuracies should overestimate rather than underestimate actual bandwidth requirements.

Naturally, the more the interesting region can be narrowed down in the parameter space, the more accurate the linearization will be. Any foresight into the probable traffic parameter combinations would thus improve the accuracy of the results.

The PCR/C ratios may vary significantly across different connections. There can be a large number of very small connections such as compressed 10–20 kbps voice calls multiplexed on a 622 Mbps link, or a small number of wideband applications in a relatively small virtual path (VP). But since the statistical multiplexing gain is usually zero when there are fewer than 10 connections, PCR/C values larger than $10^{-1}$ can be omitted. A region from 10 connections to 100,000 can be chosen as a conservative estimate for the interesting region of PCR/C.

The variation of the burst probability p can be estimated with somewhat greater accuracy. The upper bound of this probability is obviously 1, but since that value represents a CBR traffic for which there are no gains from statistical multiplexing, direct PCR allocation can be used for those traffic sources, and the statistical bandwidth allocation equation (8) does not need to give good results. Some probability value in the range of 0.6–0.7 might be a reasonable choice for switching from PCR allocation to statistical allocation. The lower bound of p is expected to be 0.02, representing highly bursty sources with a PCR/SCR ratio of 50. In the present embodiment, the p range has been chosen between 0.01 and 0.63 which should cover virtually all connections that can benefit from statistical multiplexing.

When the results of the log-linear approximation are compared with the exact values of the effective bandwidth, a transient effect before the actual values assume their asymptotic behaviour can be observed.

It can been seen that in such problematic cases, where the log-linear approximation according to equation (8) overestimates the effective bandwidth, the effective bandwithds are actually equal to or very close to PCR. After all, 10 connections with a burst probability of 0.6 can clearly not benefit from a statistical bandwidth allocation and have to revert to the PCR allocation which is performed on the basis of the PCR. Hence, the problem can be solved by using the PCR allocation whenever the approximation suggests higher values than the PCR.

For example, even for 100 connections (PCR/C=$10^{-2}$) with p=0.6, the statistical multiplexing gain is only 15%. Known CAC methods are designed to operate in a region where the statistical multiplexing gain is at least 50%, which is the so-called "interesting region" of parameter space. Thus, it seems reasonable to exclude those PCR/C values where the statistical multiplexing gain is 5% at most. This means that the interesting parameter space begins at 20 connections (PCR/C=0.05).

In order to achieve a higher accuracy of the approximation for the whole parameter space, a simple and convenient way is to fit a piecewise linear function to approximate the original effective bandwidth surface. In other words, the data points can be divided in two or three regions and a separate linear surface is fitted for each one of these regions. The approximation for the whole parameter space would then be given by a combination of these two or three surfaces.

With such a piecewise approximation, the approximation error stays almost always within 5% of the exact values. For large numbers of connections, such as 200 and above, the error stays mostly below 2%.

In terms of CAC method, underestimating effective bandwidth is worse than overestimating it. Since some of the estimated values are below the exact values, some very small constant multiplier might have to be included in these effective bandwidth calculations. As a example, the constant a in equation (8) might have to be multiplied by a value such as 1.02, so as to eliminate underestimations.

The final choice of constants for the CAC equations depends on the kind of traffic to be dealt with. The three most likely scenarios are the following:

1. If the whole imaginable parameter space is used, then a piecewise linear approximation provides the best solution, because it can cover the whole parameter space with a reasonable accuracy.
2. If most incoming connection requests fall within a certain fairly narrow range of traffic parameters, then the linearization can be performed in the neighbourhood of this region, and thus the most commonly needed bandwidth estimates are very accurate.
3. If there are a few separate regions within which most of the traffic can be classified, as many linearizations can be performed as there are these commonly visited regions, each linearization around the center of one of these regions. The final CAC equation is then a piecewise-linear combination of these focused linearizations.

Hence, the network operator should monitor traffic and see what the most common traffic parameters are. This allows the operator to fine-tune the approximation parameters stored in the memory 13 by the input means 11 in order to suit his particular needs and to achieve the highest degree of accuracy for the kind of traffic commonly experienced in each particular network node.

As already mentioned, the approximation parameters a, $\alpha$, $\beta$, and $\gamma$ depend on the guaranteed cell loss ratio. If a network chooses to support CLR values from $10^{-1}$ to $10^{-15}$ for every integer exponent of 10, there is need for 15 sets of four approximation parameters. This is a total of 60 parameters which have to be stored in the memory 13, which can be a memory of a workstation connected to the ACM switch 1.

If the operator wishes to use a piecewise linear approximation with three surfaces for each cell loss ratio and two PCR/C boundary values between the linear approximations, the number of constants grows to 210. This represents a memory requirement of less than 1 kb, so that the storing of the constants does not cause any problems.

Figure 4:
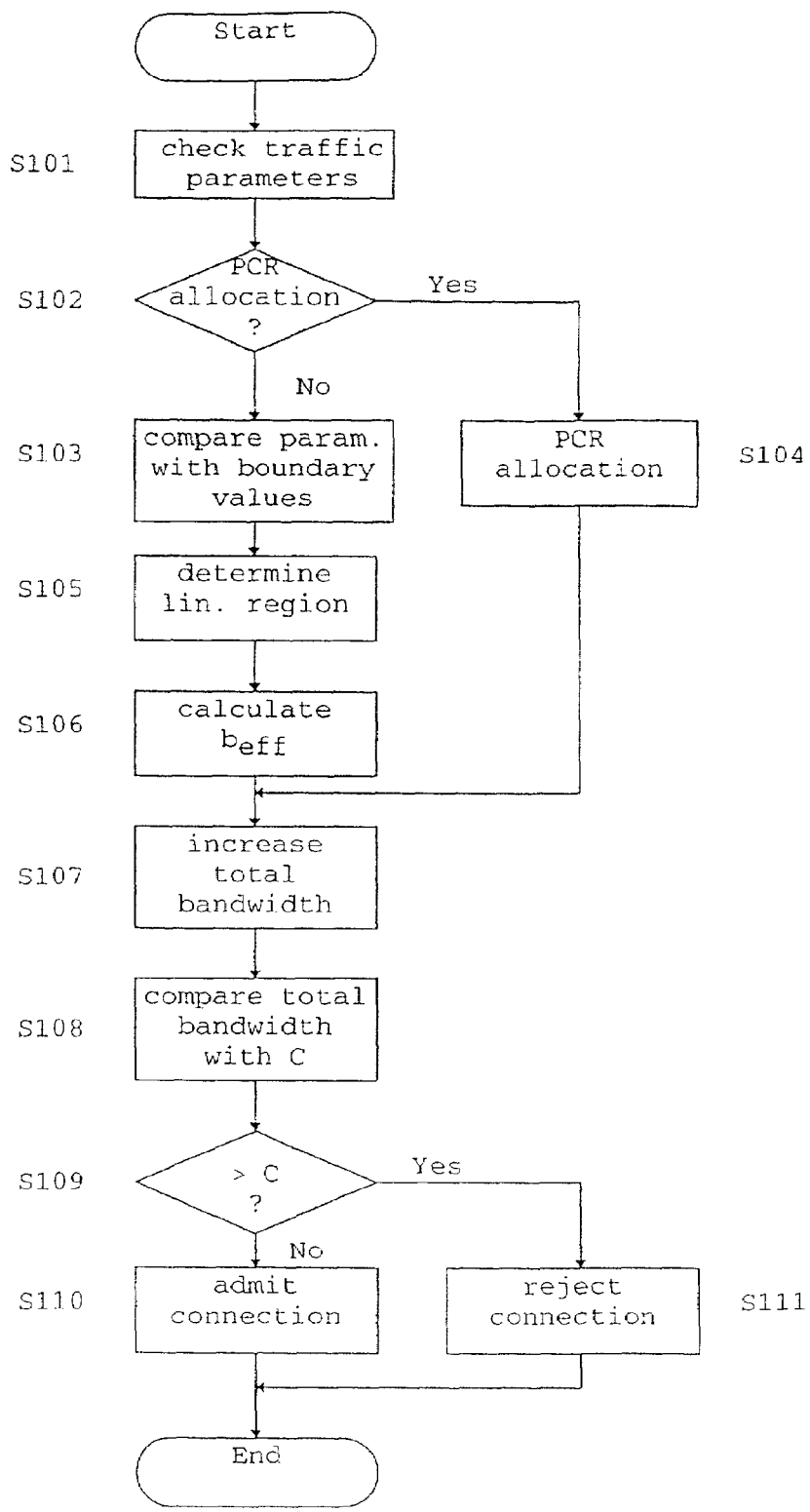
FIG. 4 shows a flow diagram of a method for performing a connection admission control in the embodiment shown in FIG. 1.

FIG. 4 shows a flow diagram of a method for performing a connection admission control in case a piecewise approximation is used.

In step S101 traffic parameters of the requested connection are checked by the control means 16. Thereafter, it is determined in step S102, whether a PCR allocation is to be performed. If so, the effective bandwidth is determined on the basis of the PCR allocation in step S104.

If the PCR allocation is not used, the traffic parameters are compared with the boundary values of the approximation regions in order to find the correct linearization region (S103, S105).

Thereafter, the determining means 12 is caused to calculate the corresponding effective bandwidth $b_{eff}$ of the requested connection on the basis of the traffic parameters of the requested connection and the stored approximation parameters selected according to the determined linearization region and desired cell loss ratio (step S106).

In step S107, the total bandwidth is obtained from the counter 14 by increasing the counter value by the calculated effective bandwidth $b_{eff}$.

In case the PCR allocation is performed, the total bandwidth is increased by the bandwidth obtained by the PCR allocation.

Thereafter, the comparator 15 is caused to compare the obtained total bandwidth with the link capacity C(S108).

If it is determined in step S109 that the total bandwidth is larger than the link capacity C, the control means 16 controls the ATM switch 1 so as to reject the connection (S111) and to restore the old counter value. On the contrary, if it determined in step S109 that the total bandwidth is not larger than the link capacity C, the control means 16 controls the ATM switch 1 so as to admit the connection and the counter value is maintained.

The steps S103 and S105 which are incorporated to enable the piecewise approximation merely consist of one or two simple comparisons between directly available values and therefore consume only a negligible time. The most time is consumed in step S106, where the effective bandwidth is determined.

The equation (8) is a simple way to approximate the effect of PCR, SCR and C on the effective bandwidth of a connection, so that the CAC method according to the present invention can be executed very fast.

It is also possible that the link capacity C, which is usually the transmission rate of a VP (virtual path) changes while there are VC (virtual circuit) connections within the VP. This certainly influences the effective bandwidths of the existing connections.

The log-linear approximation according to equation (8) offers a simple solution to the problem of a link capacity change. If the link capacity C doubles, the total counter value merely has to be multiplied by $2^\gamma$. Thereby, the old counter value can be used again and there is no need to compute the counter value for all existing connections from the beginning. Such a link rate change can be input by an operator using the input means 11, wherein the control means 16 performs the corresponding correction of the counter value. However, if piecewise linearization is used, this simple multiplication may not produce accurate values, since different connections may have different values for the parameter $\gamma$. In this case, the quickly updated value can still be used as a rough approximation while the accurate counter value is being calculated.

Thus, the CAC method according to the present invention neither burdens the computational capacity nor the memory capacity of the CAC apparatus 10, which might be a work station, as already mentioned.

The piecewise linear approximation of the bandwidth function shown in FIG. 2 can lead, for example, to the following approximation parameters:

For the region PCR/C>$10^{-2}$:
a=15.1477, $\alpha$=0.6056, $\beta$=0.9221, $\gamma$=−1,5278.

For the region $10^{-2}$>PCR/C>$10^{-3}$:
a=3.6141, $\alpha$=0.2291, $\beta$=0.9613, $\gamma$=−1,1904.

For the region $10^{-3}$>PRC/C:
a=1.3563, $\alpha$=0.0336, $\beta$=0.9945, $\gamma$=−1,0281.

Thus, the effective bandwidth of a connection is entirely determined by the values of PCR, SCR and C.

The parameter $\gamma$ which is the exponent of the link capacity C is consistently below −1. This is easily understood, since doubling the link capacity C means that at least twice as many connections can fit in. Statistical multiplexing improves the situation even more, allowing the double-sized link to carry more than double the old traffic. As the admissible number of connection increases, statistical multiplexing begins to be "fully utilized", so that the parameter tends towards −1 as the PCR/C ratio decreases further.

The value of $\beta$ is almost 1 but slightly below that. This is explained by the nature of SCR, which is the average traffic of a connection, so that it should have an exponent of around 1. The real exponent remains a little below that value, because cutting the SCR to half its original value, while keeping PCR and C constant, increases the burstiness of the connection (PCR/SCR ratio), and bursty connections are more difficult to multiplex together than constant-bit-rate connections.

The constant $\alpha$ is almost zero, being only barely positive. Increasing the PCR of a connection increases the momentary transmission speed but not the average transmission speed. If there is a large number of connections, it does not matter how bursty the individual connections are, only the average traffic determines the burden to the network. For smaller numbers of connections, burstiness is not statistically evened out, so the value of $\alpha$ remains larger.

The parameter a is a "safety factor" which multiplies the average transmission rate by some value greater than 1, so that the required cell loss ratio objective is satisfied. In this case, a=1.36 indicates that the capacity utilization of the link would be $1/1.36$=74%. Thus, the parameter a is a measure of the allowable variation of traffic around its mean value.

It is again pointed out that the approximation method is not limited to the linear approximation described by the equation (8). Any approximation suitable to approximate the function of the effective bandwidth can be used. Moreover, the present invention is not limited to the connection admission control of an ATM switch. Any asynchronous network node can be controlled by the CAC method according to the present invention.

It should be understood that the above description and the accompanying drawings are only intended to illustrate the present invention. Thus, the method and apparatus according to the invention may vary within the scope of the attached claims.

In summary, a method and apparatus for performing a connection admission control in an asynchronous network node is disclosed, wherein approximation parameters obtained by approximating a traffic parameter function defining an effective bandwidth of a connection are stored and used to determine a value representing an effective bandwidth of a requested new connection. Since the approximation parameters are calculated in advance and stored, the determination of the effective bandwidth of a requested connection can be performed by simple calculations based on the stored approximation parameters. Thus, the invention presents an extremely simple CAC procedure which is accurate enough to take full advantage of statistical multiplexing. Due to the fast calculations, the connection admission control method and apparatus are suitable for real-time connection admission control decisions.

The invention claimed is:

1. A method for performing a connection admission control in an asynchronous network node, comprising the steps of:
   storing approximation parameters obtained by approximating a traffic parameter function defining an effective bandwidth of a connection,
   determining a value representing the effective bandwidth of a requested new connection by using the stored approximation parameters,
   increasing a value representing a total effective bandwidth by the determined value so as to obtain an increased value, and
   admitting the requested new connection, if the increased value representing the total effective bandwidth is not larger than the predetermined value,
   wherein the value representing the effective bandwidth of the requested new connection is determined by using the following equation, $$b_{\mathit{eff}} = a \cdot PCR^\alpha \cdot SCR^\beta \cdot C^\gamma$$

wherein a, $\alpha$, $\beta$, and $\gamma$ represent the stored approximation parameters, PCR represents a peak cell rate of the requested connection, SCR a sustainable or average cell rate of the requested connection and C a link capacity, and wherein the approximation is a linear approximation of a function which is a logarithm of the traffic parameter function.

2. A method according to claim 1, wherein:

different approximation parameters are stored for different maximum cell loss ratios, and wherein the value representing the effective bandwidth of the requested new connection is determined in dependence on a desired maximum cell loss ratio by selecting the stored approximation parameters according to the desired maximum cell loss ratio.

3. A method according to claim 1, wherein:

the predetermined value is a link capacity of a multiplex transmission link used for establishing the requested connection.

4. A method according to claim 3, wherein:

the value representing the effective bandwidth of the requested new connection is determined as a fraction of the link capacity, and wherein the predetermined value is 1.

5. A method according to claim 1, wherein:

different approximation parameters obtained by approximating different regions of the traffic parameter function are stored, and wherein the approximation parameters are selected in accordance with the region in which traffic parameters of the requested connection are located.

6. A method according to claim 1, wherein:

said value representing the total effective bandwidth or both said value representing the total effective bandwidth and said predetermined value are updated when the link capacity changes.

7. A method for performing a connection admission control in an asynchronous network node, comprising the steps of:

storing approximation parameters obtained by approximating a traffic parameter function defining an effective bandwidth of a connection, determining a value representing the effective bandwidth of a requested new connection by using the stored approximation parameters, increasing a value representing a total effective bandwidth by the determined value so as to obtain an increased value, and admitting the requested new connection, if the increased value representing the total effective bandwidth is not larger than the predetermined value, wherein the approximated traffic parameter function is a function of a ratio between the peak cell rate and the link capacity and of a burst probability of the requested connection.

8. A method for performing a connection admission control in an asynchronous network node, comprising the steps of:

storing approximation parameters obtained by approximating a traffic parameter function defining an effective bandwidth of a connection, determining a value representing the effective bandwidth of a requested new connection by using the stored approximation parameters, and increasing a value representing a total effective bandwidth by the determined value so as to obtain the increased value, and admitting the requested new connection, if the increased value representing the total effective bandwidth is not larger than the predetermined value, wherein said increasing comprises a step of checking the ratio between the peak cell rate and the link capacity, when a connection request is received, wherein the value representing the effective bandwidth of the requested new connection is determined only on the basis of the peak cell rate, if the ratio between the peak cell rate and the link capacity exceeds a predetermined ratio.

9. An apparatus for performing a connection admission control in an asynchronous network node, comprising:

comparing means for comparing an increased value representing a total effective bandwidth with a predetermined value, and control means for admitting a requested new connection, if the increased value representing the total effective bandwidth is not larger than the predetermined value, storing means for storing approximation parameters obtained by approximating a traffic parameter function defining an effective bandwidth of a connection, determining means for determining a value representing an effective bandwidth of the requested new connection by using the stored approximation parameters, and counting means for increasing a value representing the total effective bandwidth by the determined value so as to obtain the increased value, wherein the value representing the effective bandwidth of the requested new connection is determined by using the following equation, $$b_{\mathit{eff}} = a \cdot PCR^{\alpha} \cdot SCR^{\beta} \cdot C^{\gamma}$$

wherein a, $\alpha$, $\beta$, and $\gamma$ represent the stored approximation parameters, PCR represents a peak cell rate of the requested connection, SCR a sustainable or average cell rate of the requested connection and C a link capacity, and wherein the approximation is a linear approximation of a function which is a logarithm of the traffic parameter function.

10. An apparatus according to claim 9, wherein:

said asynchronous network node is an ATM switch.

11. An apparatus according to claim 9, further comprising:

input means for inputting a desired cell loss ratio, wherein different approximation parameters for different cell loss ratios are stored in said storing means, and wherein said determining means is arranged to determine the value representing the effective bandwidth of the requested connection by using approximation parameters corresponding to an input cell loss ratio.

12. An apparatus according to claim 9, wherein:

said storing means is arranged to store different approximation parameters for different approximation regions, wherein means is arranged to compare traffic parameters of the requested connection with boundary values defining the different approximation regions, and wherein the determining means is arranged to use approximation parameters in accordance with the result of comparison.

* * * * *